UNITED STATES PATENT OFFICE.

H. L. HALL, OF BEVERLY, MASSACHUSETTS, ASSIGNOR TO THE BEVERLY RUBBER COMPANY.

IMPROVEMENT IN UTILIZING WASTE VULCANIZED RUBBER.

Specification forming part of Letters Patent No. 20,242, dated May 11, 1858.

*To all whom it may concern:*

Be it known that I, HIRAM L. HALL, of Beverly, in the county of Essex and State of Massachusetts, have invented a new and useful Improvement in the Process of Restoring Waste Vulcanized India-Rubber—that is to say, such rubber, which being once used or prepared by any of the processes described in the Letters Patent of the United States granted to Charles Goodyear, or any other process applied for similar purposes, has by any reason become waste or useless, or having been manufactured into car-springs, shoes, packing, canes, or other fabrics or substances, has heretofore been deemed to have served its purpose, and for any other cause been deemed to be unfit for further use for wearing, trade, or commerce—to such a soft, plastic, or gummy state that it may be used again in the manufacture of india-rubber substances and fabrics; and I do hereby declare that the following is a full and exact description of my said improvement, by which my process may be distinguished from all others for a similar purpose.

The restoring of vulcanized rubber, as above suggested, has been made the subject of many experiments and of Letters Patent granted to me on the 19th day of January, 1858. Of the processes so described and made public some have been too expensive to be used with economy in comparison with the processes which use the native rubber. The least expensive process is the most desirable, and I have sought diligently for some process which should supercede the necessity of using heat in restoring the rubber and have at last found it.

To enable others skilled in the manufacture of rubber fabrics to use my improved process, I shall proceed to state the details and particulars of the same.

I take the vulcanized rubber, with or without the cloth with which it is found combined, and grind it up as fine as possible and then pass it through "mullers," as they are termed, and bring it into a sheet shape or condition. I then mix it with asphalt, coal tar, resin, pitch, or shellac or any similar substance, in the proportion of ten parts of the ground sheet material to two parts of asphalt, resin, pitch, or shellac, and where coal-tar is used four parts of coal-tar should be combined with the ten parts of sheet material. The proportions may be varied to suit the article to be manufactured; but I have secured very good results by using the proportions named. The mixing of the ground sheet material with the resinous or pitchy ingredients is effected by passing them together between the mullers a number of times for a space of time from fifteen to twenty minutes. After this is effected the material is in a state to be applied to cloth or the manufacture of car-springs, &c. The result can be improved by putting the vulcanized rubber after the first grinding above referred to into a solution of lime-water and keeping it there forty-eight hours or more, or by boiling the once ground vulcanized rubber in pure water for about the same length of time; but these are not indispensable parts of the process, and a very good result may be obtained without using them.

I do not claim the mixing of asphalt, coal-tar, resin, or shellac, or other similar substance with native rubber, nor with vulcanized rubber previously dissolved by means of essential oils or other solvents; but What I do claim, and desire to have secured to me by Letters Patent, is—

The restoring of waste vulcanized rubber by grinding it and mixing it with asphalt, coal-tar, resin, pitch, shellac, or other similar substances, so that it can be used again in the manufacture of vulcanized-rubber fabrics and be as serviceable, or nearly so, as where the fabrics are made with the use of the native rubber.

H. L. HALL.

Witnesses:
EZRA LINCOLN,
JOSEPH GAVETT.